Patented Feb. 27, 1934

UNITED STATES PATENT OFFICE

1,948,730

SODIUM-SESQUI-SILICATE AND METHOD OF FORMING THE SAME

George W. Morey, Chevy Chase, Md., assignor to Philadelphia Quartz Company, Philadelphia, Pa., a corporation of Pennsylvania No Drawing. Application March 1, 1932
Serial No. 596,160

11 Claims. (Cl. 23—110)

Before discussing the objects and advantages of the present invention, it should be understood that the literature of the art relating to sodium silicates shows the existence of several metasilicates containing differing amounts of water of crystallization. The various hydrates of sodium metasilicate all yield solutions of identical character when adjusted to the same concentration with respect to solids content. An increased alkalinity, however, may be secured within limits by increasing the concentration of solids ($Na_2SiO_3$), but a limiting alkalinity for any specified concentration is imposed by the molecular ratio of sodium oxide to silica, which for all the hydrated metasilicates is the same, i. e., unity.

There are instances, however, where more alkaline solutions than can be conveniently prepared from hydrated sodium metasilicate or by other means are desirable, and it is the primary object of my invention to produce a crystalline sodium silicate more alkaline in character than the metasilicate. My invention further contemplates the production of such a silicate satisfactory in crystalline form and of excellent crystallization habits, qualities of great importance for commercial production and industrial service.

More specifically stated, it is the object of my invention to produce a hydrated sesqui-silicate of the formula $3Na_2O.2SiO_2.11H_2O$.

This compound may be obtained by the crystallization of appropriate solutions having a high ratio of $Na_2O$ to $SiO_2$. For example, I mix 100 parts by weight of $Na_2SiO_3.9H_2O$, 100 parts of NaOH, and 100 parts of water and heat the mixture until the solution is complete, after which crystallization may be effected spontaneously by allowing the solution to stand in a cool place for a comparatively long period of time or by seeding with crystals of the desired composition, in which latter event crystallization will be much more quickly effected. This procedure will result in the separation of excellent crystals of the compound $3Na_2O.2SiO_2.11H_2O$. They may then be separated from the mother liquor in any convenient manner and dried.

The solutions from which the crystals are to be obtained may be prepared in any convenient manner. For example, instead of sodium metasilicate a silicate solution of higher silica content may be used and a correspondingly larger amount of sodium hydroxide added to yield the same ultimate composition, as above indicated, and it is to be understood that the solutions referred to in the claims may be prepared according to convenience from metasilicate crystals and sodium hydroxide or from other silicates and sodium hydroxide in amounts chosen to yield the desired composition.

These crystals may be identified as follows: They show rhombic symmetry, and occur commonly as stubby prisms, elongated parallel to the vertical axis, and often flattened parallel to the front pinacoid. Dominant forms are the base, front pinacoid and brachyprism, while a macrodome is occasionally seen. Ratio $a:b:c=0.884:1:1.10$.

Orientation $a=\alpha$, $b=\beta$, $c=\gamma$. $2V=60°\pm30$.
$\alpha=1.502$, $\beta=1.510$, $\gamma=1.524$.

I wish it to be understood, however, that the foregoing procedure is referred to merely by way of example, since crystals of this general character can be obtained over a considerable range of conditions, namely, those ranges of temperature and of composition of systems from which $3Na_2O.2SiO_2:11H_2O$ may separate as a solid phase in equilibrium with mother liquor, as understood under the principles of the Phase Rule. Crystallization may be effected with or without either agitation or seeding or both.

I claim:—

1. The method of producing $3Na_2O.2SiO_2.11H_2O$ which includes preparing a solution composed of 100 parts of $Na_2SiO_3.9H_2O$, 100 parts of NaOH and 100 parts of water and subsequently effecting crystallization thereof.

2. The method of producing $3Na_2O.2SiO_2.11H_2O$ which includes preparing a solution composed of 100 parts of $Na_2SiO_3.9H_2O$, 100 parts of NaOH and 100 parts of water and subsequently effecting crystallization thereof by permitting the solution to stand.

3. The method of producing $3Na_2O.2SiO_2.11H_2O$ which includes preparing a solution composed of 100 parts of $Na_2SiO_3.9H_2O$, 100 parts of NaOH and 100 parts of water and subsequently effecting crystallization thereof by seeding with a quantity of the desired crystal.

4. The method of producing $3Na_2O.2SiO_2.11H_2O$ which includes preparing a solution of sodium silicate having a ratio of $Na_2O$ to $SiO_2$ which is higher than the ratio in metasilicate and subsequently crystallizing said solution.

5. The product of claim 1.
6. The product of claim 2.
7. The product of claim 3.
8. The product of claim 4.
9. As a new article of manufacture, the compound $3Na_2O.2SiO_2.11H_2O$.
10. As a new article of manufacture, the compound $3Na_2O.2SiO_2$ in hydrated crystalline form.
11. A method of producing $3Na_2O.SiO_2$ in hydrated crystalline form which method includes preparing a solution of more alkaline ratio than metasilicate and crystallizing.

GEORGE W. MOREY.

Certificate of Correction

Patent No. 1,948,730. February 27, 1934.

GEORGE W. MOREY

It is hereby certified that error appears in the printed specification of the above numbered patent requiring correction as follows: Page 1, line 1 of claim 11, for "$3Na_2O.SiO_2$," read $3Na_2O.2SiO_2$; and that the said Letters Patent should be read with this correction therein that the same may conform to the record of the case in the Patent Office.

Signed and sealed this 24th day of April, A. D. 1934.

[SEAL] BRYAN M. BATTEY,
*Acting Commissioner of Patents.*